United States Patent [19]

Neri et al.

[11] Patent Number: 5,302,735
[45] Date of Patent: Apr. 12, 1994

[54] POLYSILOXANIC STABILIZERS CONTAINING STERICALLY HINDERED PHENOL GROUPS AND OXAMIDIC GROUPS

[75] Inventors: Carlo Neri, San Donato Milanese; Daniele Fabbri, Riccione; Luciano Pallini, San Donato Milanese, all of Italy

[73] Assignee: Enichem Synthesis S.p.A., Palermo, Italy

[21] Appl. No.: 50,877

[22] Filed: Apr. 21, 1993

[30] Foreign Application Priority Data

Apr. 27, 1992 [IT] Italy .................. MI 92/A/000993

[51] Int. Cl.$^5$ .................... C07F 7/08; C07F 7/10
[52] U.S. Cl. ........................ 556/419; 524/188
[58] Field of Search .................. 556/419; 524/188

[56] References Cited

U.S. PATENT DOCUMENTS

| | | | |
|---|---|---|---|
| 5,039,738 | 8/1991 | Czech | 524/838 |
| 5,049,689 | 9/1991 | Peter et al. | 556/419 X |
| 5,264,604 | 11/1993 | Neri et al. | 556/419 |

FOREIGN PATENT DOCUMENTS

| | | |
|---|---|---|
| 0021596 | 5/1980 | European Pat. Off. |
| 0390153 | 3/1990 | European Pat. Off. |
| 0532121 | 9/1992 | European Pat. Off. |

*Primary Examiner*—Paul F. Shaver
*Attorney, Agent, or Firm*—George P. Hoare, Jr.

[57] ABSTRACT

Polysiloxanic compounds, containing sterically hindered phenol groups and oxamidic groups in the molecule, obtained by the copolymerization of monomers having general formula (I):

$$(R^1)_n(R^2)_{3-n}Si-R^3 \qquad (I)$$

with monomers having general formula (II):

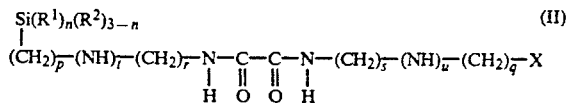

16 Claims, No Drawings

POLYSILOXANIC STABILIZERS CONTAINING STERICALLY HINDERED PHENOL GROUPS AND OXAMIDIC GROUPS

The present invention relates to polysiloxanic compounds containing sterically hindered phenol groups and oxamidic groups.

More specifically, the present invention relates to polysiloxanic compounds containing sterically hindered phenol groups and oxamidic groups in the molecule, having stabilizing properties for polymers, the procedure for their preparation and the polymeric compositions stabilized with them.

It is well known that polymers are subject to degradation with time by exposure to atmospheric agents, and that they also undergo degradation during processing and transformation processes owing to the high temperatures reached. It is also known that this degradation is accelerated by the presence of metals or metallic compounds.

In fact, very often, the polymers come into contact with metals both during the procedures for their preparation, and during their use. This happens, for example, in the use of thermoplastic polymers, and in particular polyolefins, as insulating material for copper wires and cables.

These degradation phenomena are revealed in a deterioration of the physical characteristics of the polymer, such as, for example, a decrease in the ultimate tensile strength and flexibility or, in case of transparent polymers, with alterations of the optical properties of the end-product.

To combat the above degradation phenomena, it is customary to introduce stabilizing compounds into the polymer such as, for example, metal deactivators containing sterically hindered phenolic functions, and metal complexing functions such as the amides of oxalic acid.

Some of the problems which arise in the stabilization of organic polymers basically derive from incompatibility between polymer and stabilizer and the release of the stabilizer from the polymer. It is therefore necessary to have stabilizing compounds which are as compatible as possible with the polymer to be stabilized and which have a high extraction resistance.

This latter property is particularly important when the polymers are used to prepare end-products whose final use involves contact with particular substances or solvents capable of extracting the stabilizing additive, or contact with food, in which case the absolute non-migration of the additive towards the surface of the end-product must be guaranteed.

In addition, in the production of composite end-products composed of multilayer polymers or one polymer and one inorganic support, the migration of the additive almost always causes the detachment of the various layers, a loss in the mechanical characteristics of the end-product and a more rapid degradation of the organic material.

A new group of compounds has now been found which, when used as stabilizers for polymers, have a high capacity of remaining inside the polymer in which they are incorporated for a long period of time without changing the physical properties.

The present invention therefore relates to polysiloxanic compounds, containing in the molecular sterically hindered phenol groups and oxamidic groups, obtained by the copolymerization of monomers having general formula (I):

$$(R^1)_n(R^2)_{3-n}Si-R^3 \quad (I)$$

where:

$R^1$ is an alkyl radical, linear or branched, containing from 1 to 20 carbon atoms, or a phenyl;

$R^2$ is equal to $OR^1$ or Cl;

$R^3$ is a radical selected from the group including:

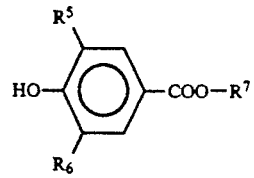

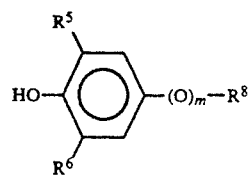

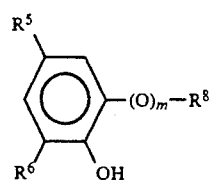

wherein:

$R^5$ and $R^6$, the same or different, are alkyl radicals, linear or branched, containing from 1 to 10 carbon atoms;

$R^7$ is an alkyl radical, linear or branched, containing from 3 to 10 carbon atoms;

$R^8$ is an alkyl radical, linear or branched, containing from 1 to 10 carbon atoms, or a biradical selected from $-R^9-COO-R^{10}$, $-R^9-COO-R^{1}-O-S-R^{11}$ and $-R^{10}-S-R^{11}$ where $R^9$, $R^{10}$ and $R^{11}$, the same or different, are alkyls, linear or branched, containing from 2 to 10 carbon atoms;

n is equal to 0, 1 or 2;

m is equal to 0 or 1;

with monomers having general formula (II):

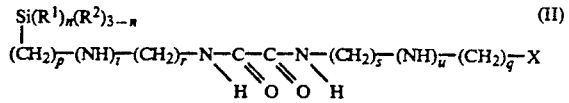

wherein:

$R^1$, $R^2$ and n have the meaning described above;

X is H or $-Si(R^1)_n(R^2)_{3-0284\,n}$;

p and q, the same or different, are integers between 1 and 10;

r and s, the same or different, are integers between 0 and 10;

t and u, the same or different, are 0 or 1.

Preferred monomers having general formula (I) according to the present invention are those wherein:

$R^1$ is $CH_3$;

$R^2$ is methoxy or ethoxy;

$R^3$ is

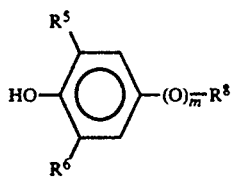

$R^5$ and $R^6$, the same or different, are an alkyl radical, linear or branched, containing from 1 to 4 carbon atoms;

$R^8$ is an alkyl radical, linear or branched, containing from 3 to 8 carbon atoms, or a —(CH$_2$)$_2$—COOR$^{10}$ radical;

$R^{10}$ is an alkyl radical, linear or branched, containing from 3 to 8 carbon atoms;

m is equal to 0;

n is equal to 1.

Examples of monomers having general formula (I) are:

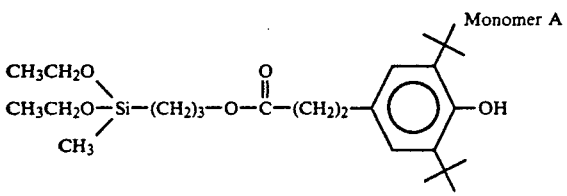

Monomer A

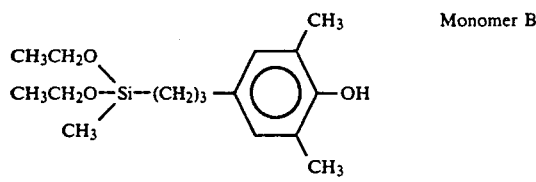

Monomer B

Preferred monomers having general formula (II) according to the present invention are those belonging to the following classes:

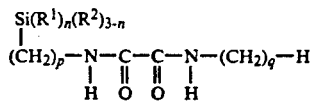

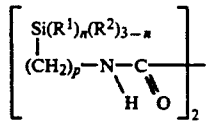

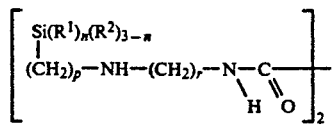

wherein $R^1$, $R^2$, n, p, q and r have the meaning described above.

Examples of monomers having general formula (II) are:

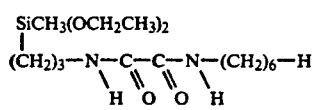

Monomer C

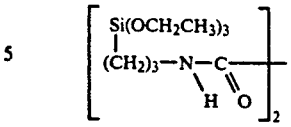

Monomer D

Monomers having general formula (I) can be prepared, for example, according to what is described in U.S. Pat. No. 4,888,375 in the name of the Applicant.

Monomers having general formula (II) wherein X is equal to $Si(R^1)_n(R^2)_{3-n}$ are prepared by the reaction of diethyloxalate with commercial compounds which correspond to the general formula (III):

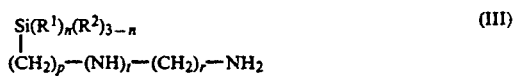

wherein $R^1$, $R^2$, n, p, r, t, have the meaning previously defined.

Monomers having general formula (II) wherein X is a hydrogen atom are prepared starting from a compound having general formula (IV):

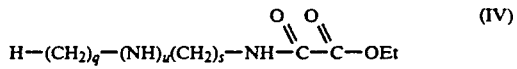

obtained by the reaction of diethyloxalate with an amine having general formula (V):

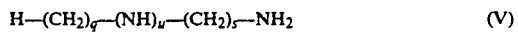

wherein q, u and s, have the meaning previously described, with a compound having general formula (III)

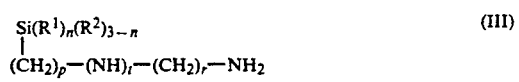

wherein $R^1$, $R^2$, n, p, r and t have the meaning previously described.

The above reactions are carried out in the presence of an organic solvent selected from alcohols, ethers or hydrocarbons such as, for example, toluene and n-hexane.

The reactions are carried out at a temperature of between 10° and 150° C., preferably at room temperature.

When the reaction has finished the product is recovered after the volatiles have been removed by distillation.

Examples of compounds having general formula (III) are: 3-aminopropyltriethoxysilane, 3-(diethoxymethylsilyl)propylamine, N-[3-(trimethoxysilyl)propyl] ethylene diamine, etc.

The compounds having general formula (IV) can be prepared, for example, according to what is disclosed in U.S. Pat. No. 4,187,315.

Examples of amines having general formula (V) are: ethylamine, hexylamine, butylamine, etc.

A procedure for the production of the polysiloxanic compounds containing sterically hindered phenol groups and oxamidic groups in the molecule, of the present invention, includes:

a) mixing a monomer having general formula (I) with a monomer having general formula (II) in a molar ratio (I)/(II) of between 1:5 and 5:1, preferably between 1:1 and 2:1;

b) polymerizing the mixture thus obtained in the presence of water, or a mixture of solvent/water in ratios of up to 10:1 and, possibly, catalysts such as, for example, alkaline hydroxides (sodium hydrate, potassium hydrate, etc.), mineral acids (hydrochloric acid, hydrobromic acid, etc.), organic acids (acetic acid, methansulphonic acid, etc.), organic salts (dibutyltindilaurate, zinc octanoate, etc.).

The temperature in phase (b) is between 20° C. and 100° C. and the reaction is carried out until chromatographic analysis or TLC shows that the starting monomers are no longer present. The times generally range from 2 to 20 hours. The polymerization, initiated in phase (b), is completed by removing the volatiles by treatment at reduced pressure, generally between 20 and 0.5 mm Hg, at temperatures ranging from 60° C. to 150° C., for a period of between 2 and 12 hours.

The organic acid, possibly added to water, is selected from the group including ethers, such as tetrahydrofuran, alcohols, such as ethanol, aliphatic hydrocarbons, such as heptane, alicyclics, such as cyclohexane, or aromatics, such as toluene.

The concentration of the catalyst is within the range of 0.005-1% by weight with respect to the reagents charged.

The products of the present invention can be used as stabilizers of polymers.

The polymers which can be stabilized with the compounds of the present invention are, in general, thermoplastic polymers. More specifically, polyolefins are preferred, such as high and low density polyethylene (HDPE and LDPE), linear low density polyethylene (LLDPE), cross-linked polyethylene (XLPE), polypropylene, the copolymers of ethylene and propylene, terpolymers EPDM, ABS, synthetic rubbers, etc.

The stabilizers of the present invention are added as additives to the polymers either in the final phase of the synthesis process of the latter or in the production phase of the end-products.

Addition of the products in the preparative phase of the end-products is however more widely used in practice because it allows a level of addition which conforms to the characteristics of the end-product to be obtained.

The stabilizers of the present invention can be used in combination with one or more additional additives selected from, for example, antioxidants, heat and light stabilizers, basic co-stabilizers, nucleating agents, etc.

In particular, additives can be used based on sterically hindered amines, such as those corresponding to the trade-names Uvasil 299 of EniChem Synthesis, Tinuvin 770, Tinuvin 662, Chimassorb 944 of Ciba-Geigy, or antioxidants of the sterically hindered phenol group such as Anox 20, Anox PP18 of EniChem Synthesis, or also phosphites and/or phosphonites such as Ultranox 626 of General Electric, Alkanox 240 of EniChem Synthesis, Sandostab PEPQ of Sandoz, or finally organic compounds containing sulphur of the type distearyl thiodipropionate and dilauryl thiodipropionate.

The quantity of stabilizing additive according to the present invention normally used varies from 0.05% to 1% by weight of the weight of the polymer to be stabilized, and preferably from 0.1% to 0.5%.

The following examples, which are purely illustrative, provide a better understanding of the possibilities of embodiment of the present invention but do not limit it in any way.

EXAMPLE 1

Preparation of the compound having formula

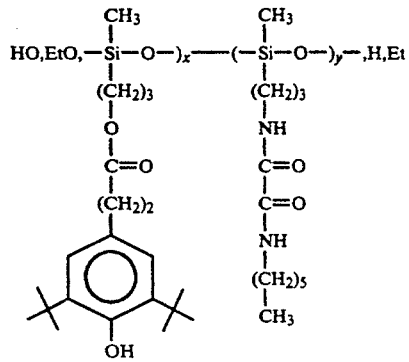

11.94 g (0.026 moles) of Monomer A, 9.14 g (0.026 moles) of Monomer C, 30.0 ml of ethanol, 5.0 ml of water and 0.2 ml of acetic acid are charged into a 100 ml flask equipped with a magnetic stirrer, thermometer and claisen.

The solution is heated to 80° C. and left at this temperature for six hours. The volatile products are subsequently eliminated by distillation under vacuum.

After eliminating the volatile products, 0.05 g of dibutyltindilaurate are added to the reaction mixture and treatment is carried out at reduced pressure (2 mm Hg) for four hours gradually increasing the temperature from 60° C. to 120° C.

16.8 g of a resinous product soluble in toluene and whose average osmometric molecular weight is 1500 Da, are obtained with a 98% yield.

NMR and IR spectroscopic analyses confirm the structure indicated with a ratio x/y=1.

Characterization

PMR Spectrum in p.p.m.: 8.1-7.5m (2H) ; 6.95s (2H) 5.06s (1H); 4.03t (2H); 3.26q (4H); 2.84t (2H); 2.56t (2H) ; 1.65m, 1.50m, 1.40s, 1.26m (30H) ; 0.85s (3H) 0.56s (4H) ; 0.10 (6H) .

Infra-red spectrum, main absorption bands (cm$^{-1}$): 3660, 3320, 1740, 1670, 1520, 1440, 1100-1000, 880, 800.

EXAMPLE 2

Preparation of the copolymer of example 1 with a low molecular weight

The same procedure is carried out as in example 1 starting from 9.0 g (0.020 moles) of Monomer A and 6.06 g (0.017 moles) of Monomer C, but reducing the reaction time so as to only partially hydrolize the monomers.

At the end of the process, 13.7 g of a waxy solid, whose average osmometric molecular weight is 700 Da, are obtained with a 97% yield.

NMR and IR spectroscopic analyses show the same values found for the compound in example 1. The only difference observed in the analyses is due to the presence of signals given by the group —Si—O—CH$_2$CH$_3$, at 3.7 p.p.m., 1.17 p.p.m. and 955 cm$^{-1}$.

NMR and IR spectroscopic analyses confirm the structure indicated with a ratio x/y=1.1.

EXAMPLE 3

Preparation of the compound having formula

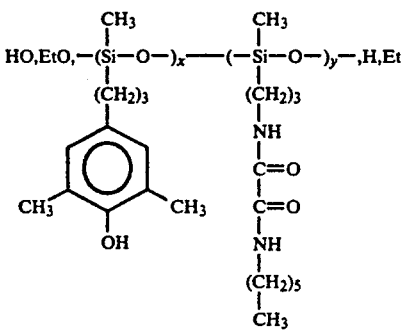

The same procedure is carried out as in example 1 using 5.04 g (0.017 moles) of Monomer B and 5.89 g (0.017 moles) of Monomer C.

At the end of the process 7.70 g of a resinous product are obtained with a 97% yield.

NMR and IR spectroscopic analyses confirm the structure indicated with a ratio x/y=1.

Characterization

PMR spectrum in p.p.m. (widened signals): 8.2–7.5 (2H); 6.72 (2H); 4.95 (1H); 3.7 (0.7H); 3.25 (4H); 2.44 (2H); 2.18 (6H); 1.55 (6H); 1.26 (7H); 0.85 (3H); 0.53 (4H); 0.10 (6H).

Infra-red spectrum, main absorption bands (cm$^{-1}$): 3320, 1670, 1530, 1100–1000, 870, 800.

EXAMPLE 4

Preparation of the compound of the copolymer produced from monomers A and D 9.60 g (0.021 moles) of Monomer A and 5.26 g (0.011 moles) of Monomer D are dissolved in 30 ml of ethanol and reacted with 5.0 ml of water in the presence of 0.1 ml of acetic acid at room temperature, for eight hours.

The volatile products are eliminated by distillation under vacuum at reduced pressure and the mixture thus obtained, is suspended in toluene and brought to boiling point. It is left at boiling point for five hours eliminating the water by means of a separating funnel.

9.50 g of a resinous solid are obtained from the toluene solution, after elimination of the solvent by distillation at reduced pressure.

NMR and IR spectroscopic analyses confirm the structure indicated with a ratio x/y=2.

Characterization

PMR spectrum in p.p.m. (widened signals): 6.96 (2H); 5.06 (1H); 4.02 (2H); 3.73 (2.6H); 3.27 (2H); 2.87 (2H); 2.56 (2H); 1.64, 1.40, 1.22 (26H); 0.56 (4H); 0.095 (3H).

Infra-red spectrum, main absorption bands (cm$^{-1}$): 3650, 3320, 1740, 1670, 1520, 1440, 1100, 960, 800.

EXAMPLE 5

Preparation of HDPE stabilized with the compounds of the invention

Mixtures of commercial HDPE with 0.2% by weight of stabilizer are prepared using the stabilizing compounds prepared as described in examples 1–4. Said mixture also contains 1% by weight of copper powder.

Each of these mixtures is extruded in a laboratory Brabender with 60 rpm of the screw and with the following temperature profile from the head zone to the tail: 180°–190°–210°–220° C.

The samples thus extruded are cut into pellets and pressed for three minutes at 200° C., to obtain slabs having a thickness of 0.5 mm.

Slabs of HDPE containing 1% of copper powder (comparison A) and HDPE containing 1% of copper powder and 0.2% of 2,2'oxamide-bis-ethyl-3(3,5-di-t-butyl-4-hydroxyphenyl)propionate which corresponds to the commercial product XL-1 of Uniroyal (comparison B), are similarly prepared.

The slabs thus obtained were extracted in soxhlet for five hours with n-heptane.

The quantity of stabilizing additive in the slabs is approximately estimated by IR spectroscopy, calculating the absorbance variation at 1660 cm$^{-1}$.

The extraction resistance (ER) of the additive is expressed as:

$$ER = A/A_0 \times 100$$

wherein $A_0$ and $A$ are respectively the absorbance values before and after the extraction treatment.

The extracted slabs were subjected to thermal treatment in an air-circulation oven at 120° C.

To observe the degradation process in the test samples, the embrittlement times (E.T.) are taken into consideration.

The results, shown in Table 1, show how the polymeric stabilizers of the present invention are much more resistant to extraction than the commercial stabilizer and keep their stabilizing properties after the extraction process.

TABLE 1

| Additive | ER (%) | E.T. (hrs) |
| --- | --- | --- |
| Example 1 | 40 | 210 |
| Example 2 | 30 | 102 |
| Example 3 | 60 | 196 |
| Example 4 | 100 | 102 |
| Comparison A | = | 32 |
| Comparison B | 0 | 32 |

We claim:

1. Polysiloxanic compounds, containing in the molecule sterically hindered phenol groups and oxamidic groups, obtained by the copolymerization of monomers having general formula (I):

wherein:
R$^1$ is an alkyl radical, linear or branched, containing from 1 to 20 carbon atoms, or a phenyl;
R$^2$ is equal to OR$^1$ or Cl;
R$^3$ is a radical selected from the group consisting of:

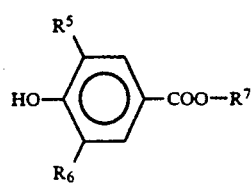

-continued

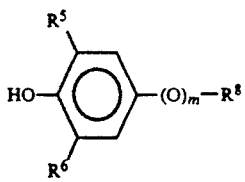

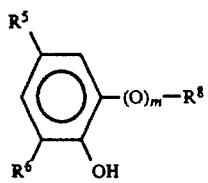

wherein:

R⁵ and R⁶, the same or different, are alkyl radicals, linear or branched, containing from 1 to 10 carbon atoms;

R⁷ an alkyl radical, linear or branched, containing from 3 to 10 carbon atoms;

R⁸ is an alkyl radical, linear or branched, containing from 1 to 10 carbon atoms, or a biradical selected from —R⁹—COO—R¹⁰, —R⁹—COO—R¹⁰—S—R¹¹ and —R¹⁰—S—R¹¹ where R⁹, R¹⁰ and R¹¹, the same or different, are alkyls, linear or branched, containing from 2 to 10 carbon atoms;

n is equal to 0, 1 or 2;

m is equal to 0 or 1;

with monomers having general formula (II):

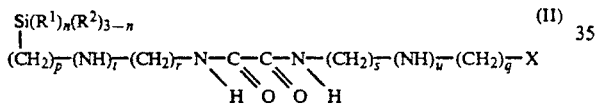

wherein:

R¹, R² and n have the meaning described above;

X is H or —Si(R¹)ₙ(R²)₃₋ₙ;

p and q, the same or different, are integers between 1 and 10;

r and s, the same or different, are integers between 0 and 10;

t and u, the same or different, are 0 or 1.

2. Polysiloxanic compounds according to claim 1, wherein the monomers having general formula (I) are those wherein:

R¹ is CH₃;

R² is methoxy or ethoxy;

R³ is

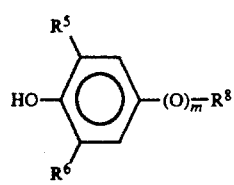

R⁵ and R⁶, the same or different, are an alkyl radical, linear or branched, containing from 1 to 4 carbon atoms;

R⁸ is an alkyl radical, linear or branched, containing from 3 to 8 carbon atoms, or a —(CH₂)₂—COOR¹⁰ radical;

R¹⁰ is an alkyl radical, linear or branched, containing from 3 to 8 carbon atoms;

m is equal to 0;

n is equal to 1.

3. Polysiloxanic compounds according to claim 2, wherein the monomer having general formula (I) is:

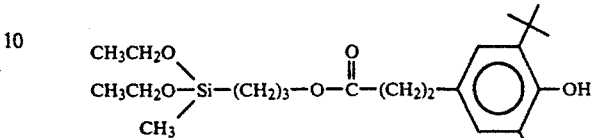

4. Polysiloxanic compounds according to claim 2, wherein the monomer having general formula (I) is:

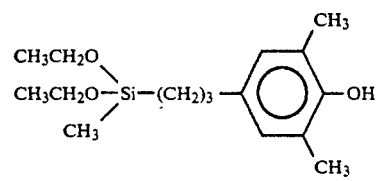

5. Polysiloxanic compounds according to claim 1, wherein the monomers having general formula (II) are those belonging to the following groups:

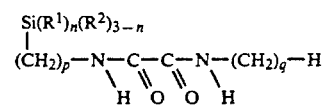

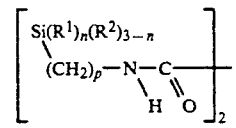

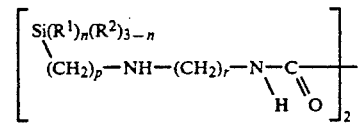

wherein R¹, R², n, p, q and r having the meaning described above.

6. Polysiloxanic compounds according to claim 5, wherein the monomer having general formula (II) is:

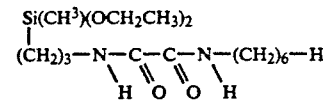

7. Polysiloxanic compounds according to claim 5, wherein the monomer having general formula (II) is:

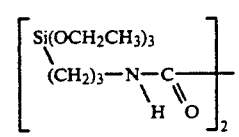

8. Procedure for the preparation of polysiloxanic compounds according to claim 1 which includes:
   a) mixing a monomer having general formula (I) with a monomer having general formula (II) in a molar ratio (I)/(II) of between 1:5 and 5:1;
   b) polymerizing the mixture thus obtained in the presence of water, or a mixture of organic solvent/water in ratios of up to 10:1 and, may be run in the presence of catalysts.

9. Procedure for the preparation of polysiloxanic compounds according to claim 8, wherein the temperature in step (b) is between 20° C. and 100° C., the reaction is carried out for a period of between 2 and 20 hours and the polymerization is completed by removing the volatiles by treatment at reduced pressure, generally ranging from 20 to 0.5 mm Hg, at temperatures ranging from 60° C. to 150° C., for a period of between 2 and 12 hours.

10. Procedure for the preparation of polysiloxanic compounds according to claim 8, wherein the organic solvent is selected from the group including ethers, alcohols, aliphatic, alicyclic or aromatic hydrocarbons.

11. Procedure for the preparation of polysiloxanic compounds according to claim 8, wherein the catalysts are selected from alkaline hydroxides, mineral acids, organic acids or organic salts.

12. Procedure for the preparation of polysiloxanic compounds according to claim 8, wherein the concentration of the catalyst is within the range of 0.005-1% by weight with respect to the reagents charged.

13. Method for the stabilization of an organic polymer, which consists in incorporating in said polymer a quantity of a stabilizing compound according to claim 1, generally ranging from 0.05% to 1% by weight of the polymer to be stabilized.

14. Method according to claim 13, wherein the organic polymer to be stabilized is selected from the group including polyolefins, their copolymers, terpclymers EPDM, ABS and synthetic rubbers.

15. Polymeric compositions including an organic polymer and a quantity of a stabilizing compound according to claim 1, generally ranging from 0.05% to 1% by weight of the polymer to be stabilized.

16. Polymeric compositions according to claim 15, wherein the organic polymer to be stabilized is selected from the group including polyolefins, their copolymers, terpolymers EPDM, ABS and synthetic rubbers.

* * * * *